(12) United States Patent
Babuder et al.

(10) Patent No.: US 6,318,766 B1
(45) Date of Patent: *Nov. 20, 2001

(54) FACE SEAL GLAND WITH RAISED PERIPHERAL RING HAVING CIRCUMFERENTIALLY SPACED RECESSES

(75) Inventors: Gerald A. Babuder, Mentor; Timothy A. Barney, Aurora; Gregory L. Piper, North Ridgeville, all of OH (US)

(73) Assignee: Swagelok Company, Solon, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,719

(22) Filed: Sep. 15, 1997

(51) Int. Cl.⁷ ........................................ F16L 25/00
(52) U.S. Cl. .................. 285/328; 277/609; 285/336; 285/917
(58) Field of Search ...................... 285/328, 917, 285/379, 336; 277/609

(56) References Cited

U.S. PATENT DOCUMENTS

| | | |
|---|---|---|
| 3,521,910 | 7/1970 | Callahan, Jr. et al. . |
| 3,747,963 | 7/1973 | Shivak . |
| 4,303,251 | 12/1981 | Harra et al. . |
| 4,817,993 * | 4/1989 | Zoboli ........................................ 285/54 |
| 5,145,219 | 9/1992 | Babuder . |
| 5,251,941 | 10/1993 | McGarvey . |
| 5,366,261 * | 11/1994 | Ohmi et al. ........................ 285/328 |
| 5,445,393 | 8/1995 | Ramberg . |
| 5,720,505 | 2/1998 | Ohmi et al. . |

FOREIGN PATENT DOCUMENTS

| | | |
|---|---|---|
| 0 567 924 A1 | 11/1993 | (EP) . |
| WO 89/03495 | 4/1989 | (WO) . |

* cited by examiner

Primary Examiner—Chuck Y. Mah
Assistant Examiner—Alison K. Pickard
(74) Attorney, Agent, or Firm—Calfee, Halter & Griswold, LLP

(57) ABSTRACT

A coupling assembly includes first and second coupling members or glands having end faces that sealingly engage opposite faces of an annular gasket. An end face of the coupling member includes a circumferentially continuous seal bead disposed adjacent the bore of the coupling member. A bead thus contacts the gasket along a radially inner region thereof. Disposed over a major portion of the radial face is a substantially planar region. The planar region is adapted to engage the gasket during make-up so that the user encounters an increase or positive feedback of increased torque once the coupling assembly is properly made-up. The end face also includes a raised ring disposed along the radial perimeter. The ring extends outwardly from the end face a dimension slightly greater than that of the bead so that it provides initial engagement with the gasket. This locks the coupling member and gasket against relative rotation during make-up. Moreover, recesses are preferably provided in the ring at spaced circumferential locations to receive the gasket therein and lock the coupling member to the gasket.

17 Claims, 3 Drawing Sheets

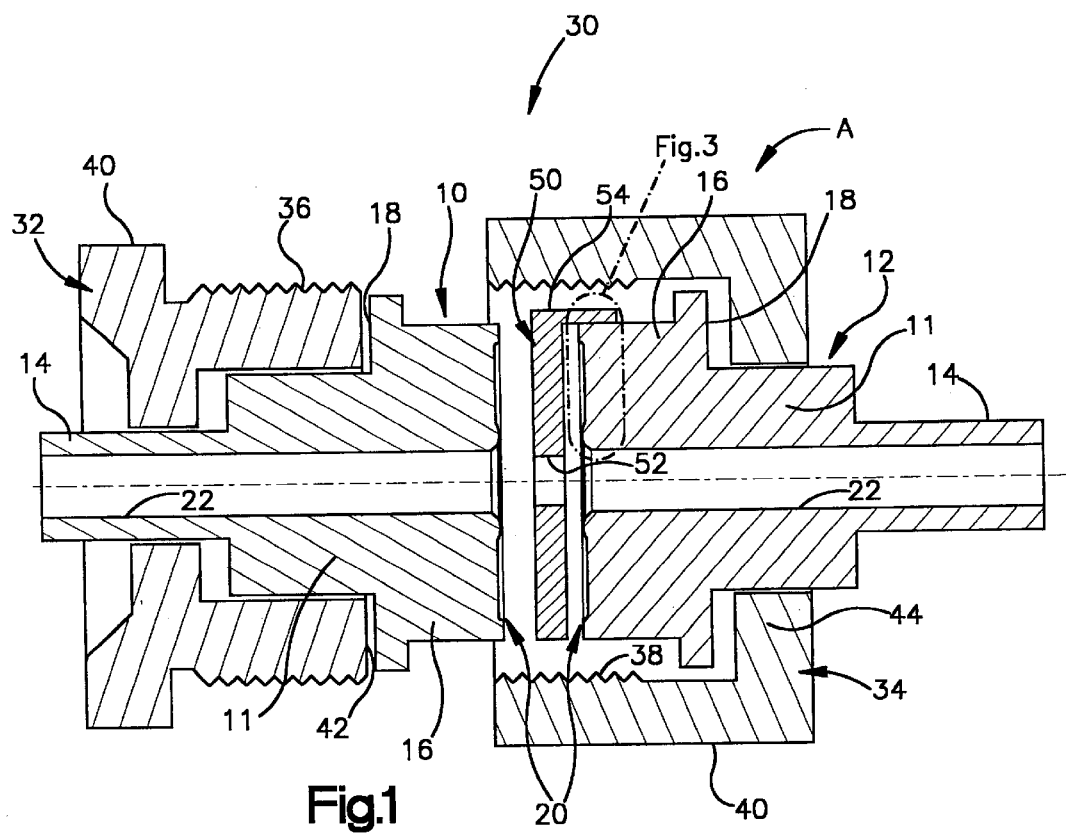
Fig.1
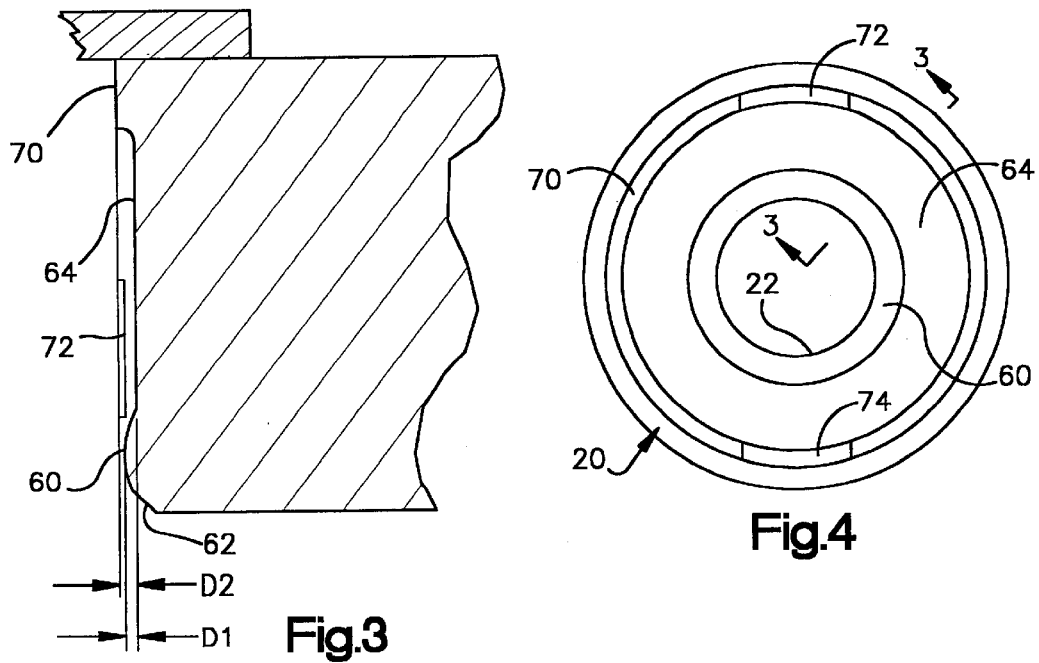
Fig.3
Fig.4

US 6,318,766 B1

FACE SEAL GLAND WITH RAISED PERIPHERAL RING HAVING CIRCUMFERENTIALLY SPACED RECESSES

BACKGROUND OF THE INVENTION

This invention is concerned with couplings of the type shown and described in U.S. Pat. Nos. 3,521,910 and 5,145,219. These patents are incorporated herein by reference and describe tube couplings wherein first and second coupling components or glands with central through passages or bores are disposed in mating relation. Particularly, end faces include annular raised beads arranged to sealingly engage on opposite sides of an annular metal gasket. A threaded nut assembly acts to drive the end faces toward each other and cause the beads to sealingly engage the gasket. The sealing end faces can be located on separate glands or on a "block", e.g. a face of a fluid component such as a valve, regulator, etc.

Commercially successful versions of this type of coupling assembly require a desired amount of compression of the sealing end faces on opposite sides of the gasket. This is achieved by design of the components and instructing the user to rotate the nut assembly a predetermined amount. Because of the pitch of the thread and the design of the individual components, a desired compression is thus achieved.

In order to eliminate the potential for over tightening by the user, it has been suggested that a restraint be provided to limit the amount of compression imposed on the seal gasket. For example, U.S. Pat. No. 5,482,332 provides axial projections adapted to engage one another and limit the potential for over tightening.

Still another concern with the face seals of this general type is relative movement between the end face seals and the gasket. In order that a precise seal be formed, it is desired that the gasket be locked into place relative to end faces and that the end faces be axially advanced toward one another and into sealing engagement with opposite faces of the gasket.

It is also desired that the sealed relationship between the gasket and the respective glands be maintained even if torque is applied to the fitting after make-up. For example, if torque is applied to a tube end while the remainder of the coupling assembly is held in place, then there is a concern that the seal may be compromised.

Still another issue associated with these coupling assemblies is the requirement for ultra-high purity. That is, the ultra-clean environment associated with these types of fluid components requires elimination of minute particles that might otherwise be ignored in less demanding environments. Any opportunity to decrease the prospect for particle generation is desired.

The present invention contemplates a new and improved coupling assembly that overcomes all of the above referenced problems and others and provides positive stop feedback, resists torque and elimination of relative motion between mating components, and increases the resistance of the coupling assembly to loosening.

SUMMARY OF THE INVENTION

According to the present invention, a preferred form of coupling assembly includes end faces of glands/coupling members disposed for sealing against opposite faces of an annular gasket. The end faces include a bead extending outwardly from the bore of the gland/coupling member, an annular substantially planar region disposed radially outward thereof, and a raised ring located radially outward of the annular planar region.

According to another aspect of the invention, the ring includes a recess for receiving the gasket therein during make-up of the coupling assembly.

According to another aspect of the invention, the raised ring extends axially outward from the end face a dimension greater than the seal bead.

A principal advantage of the invention is the ability to lock the gasket relative to the coupling members through use of the raised ring.

Still another advantage of the invention resides in the increase in torque associated with the annular planar region that provides a distinct feedback to the user during make-up.

Still another advantage of the invention resides in the additional sealing area provided by the annular planar region and, ultimately, a coupling assembly that exhibits increased resistance to loosening due to torque applied to the made-up assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts. Preferred embodiments of the invention will be described in detail in the specification and illustrated in the accompanying drawings. The drawings include:

FIG. 1 which is an exploded longitudinal cross-sectional view of the individual components of a preferred coupling assembly;

FIG. 3 is an enlarged detail view of the encircled area in FIG. 1;

FIG. 4 is an elevational view of the seal face of the coupling member;

DETAILED DESCRIPTION OF THE PREFERRED EMBODIMENT

Figure 2A:
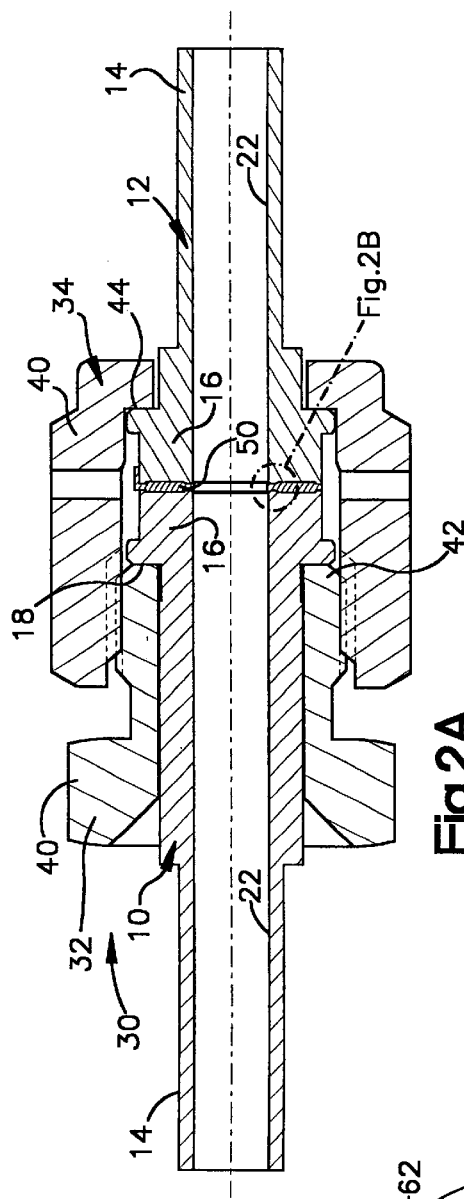
FIG. 2A is a longitudinal cross-sectional view of the assembly in a made-up condition.

Reference is now made to the drawings which illustrate the preferred embodiment of the invention only and are not intended as a limitation. Turning first to FIG. 1, a preferred embodiment of a coupling assembly A is shown therein. It includes a first coupling member or gland 10 and a second coupling member or gland 12. As briefly mentioned above, the coupling member may be a gland (as illustrated in FIG. 1) or a surface of a fluid component such as a valve, regulator, or the like, that is to be sealingly connected to another coupling member. Thus, the following description applies to various types of coupling members and should not be construed as being limited to the preferred embodiment shown unless specifically noted. Each gland is of generally hollow cylindrical configuration and like reference numerals will refer to like parts. A first end 14 of the gland is adapted for connection with a fluid system (not shown) such as a tube or pipe. A second end 16 of the gland has an enlarged diameter dimension that defines a rear shoulder 18 that faces the first end 14 and a seal or end face 20 facing in the opposite direction. Before describing the particulars of the end face, the remainder of the tube coupling assembly will be described, since it is relatively conventional and well-known.

For example, each gland has a through bore or passage 22 that extends from the first end to the second end. As will be understood, the passage provides fluid communication through the coupling assembly. A nut assembly 30, defined by a first or male nut member 32 and a second or female nut member 34, is received about the facing glands. That is, the end faces are disposed in opposed facing relation so that the through passages of the glands are in substantially aligned relation. As is well known in the art, the male nut member 32 includes external threads 36 that cooperate with internal threads 38 of the female member. Tool or wrench flats 40 are typically provided on the nut members to facilitate make-up of the fitting, i.e., threaded advancement of the male member relative to the female nut member, thereby urging the first and second glands toward one another (FIG. 2A). In this particular arrangement, an end 42 in the male nut member engages the radial shoulder 18 of the first gland. Likewise, a shoulder 44 of the female nut member engages the rear shoulder 18 of the second gland. Thus, as the nut assembly is tightened, the glands are axially advanced toward one another.

Interposed between the end faces of the first and second glands is an annular flat metal gasket 50. The gasket has an inner opening 52 that substantially matches that of the diameter of the through passages in the glands. Additionally, the outer perimeter of the gasket is dimensioned to be approximately the same diameter as the terminal edge perimeter of the end faces. Thus, the gasket 54 is located between the first and second glands.

Figure 2B:
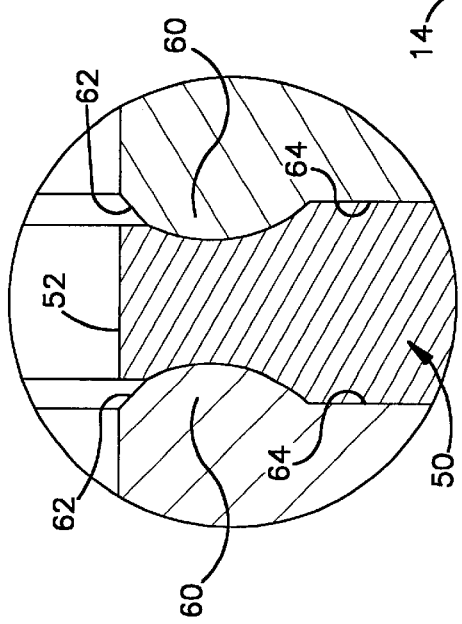
FIG. 2B is an enlarged view of the encircled region of FIG. 2A showing the made-up coupling assembly.

As previously indicated, the end faces 20 of the respective first and second glands are adapted to sealingly engage opposed faces of a gasket. According to the preferred embodiment, each end face includes a circumferentially continuous bead 60 preferably defined by a smooth arcuate or curved surface (FIGS. 2B and 3). A preferred bead configuration has a generally arcuate shape defined by a generally constant radius (FIG. 3). Of course, other bead profiles may be advantageously used without departing from the scope and intent of the present invention. Preferably the center of curvature is disposed radially outward from the wall of the through passage a dimension closely approximating the radius of the curve, although the bead is intended to extend axially outward from the end face of the gland. The inner radial edge portion of the bead is smoothly transitioned into the through passage. For example, a chamfered surface 62 interconnects the seal bead profile with the wall defining the through passage of the gland. Thus, the bead is disposed at the radial inner area of the end face and protrudes axially outward from the seal face a predetermined dimension D1.

Extending radially outward from the bead is a substantially annular planar region 64 that extends over a substantial portion of the overall radial dimension of the gland seal face. The planar region 64 is recessed relative to the bead on the order of thousandths of an inch. As will become described in greater detail below, the planar region provides a positive feedback to the user upon make-up of the coupling assembly since when it contacts the gasket it provides an increase in the torque. This torque increase acts as a positive feedback to the user making up the coupling assembly.

Disposed at the radial outermost portion of the seal face is a raised rim 70. While the bead and planar region are circumferentially continuous, the raised rim is substantially continuous. It includes first and second recesses 72, 74 (FIG. 4) which extend axially inward only a few thousandths of an inch into the raised rim. Preferably the recesses 72, 74 are disposed in diametrically opposed relation. It will be understood, however, that the recesses preferably only extend in a circumferential direction over a minor portion of the entire circumference. This will become more apparent for reasons to be detailed below. Moreover, although a different number of recesses can be provided, the preferred arrangement includes discreet spaced recesses as opposed to a continuous series of recess such as a knurled perimeter. Again, this will become more apparent for reasons to be described further below.

The raised rim extends axially outward from the seal face a height or a dimension D2 (FIG. 3) slightly greater than that of the bead. This dimensioning assures that the seal face engages the gasket initially along the raised rim. As the coupling assembly is made-up, relative rotation between the coupling member and gasket is thus prevented. Continued axial advancement of the coupling members toward one another and into compressed, sealing engagement with opposite faces of the gasket ultimately results in gasket material being axially displaced into the recess 72, 74 (FIG. 2B). The receipt of the gasket in the recesses provides a locking feature which assures that the gasket and the coupling member do not rotate relative to one another, even at elevated torque levels. Preferably, if undue torque were applied, the gasket would fail and shear as opposed to the gasket rotating relative to the coupling member because of the recess provided in the raised rim.

Figure 5:
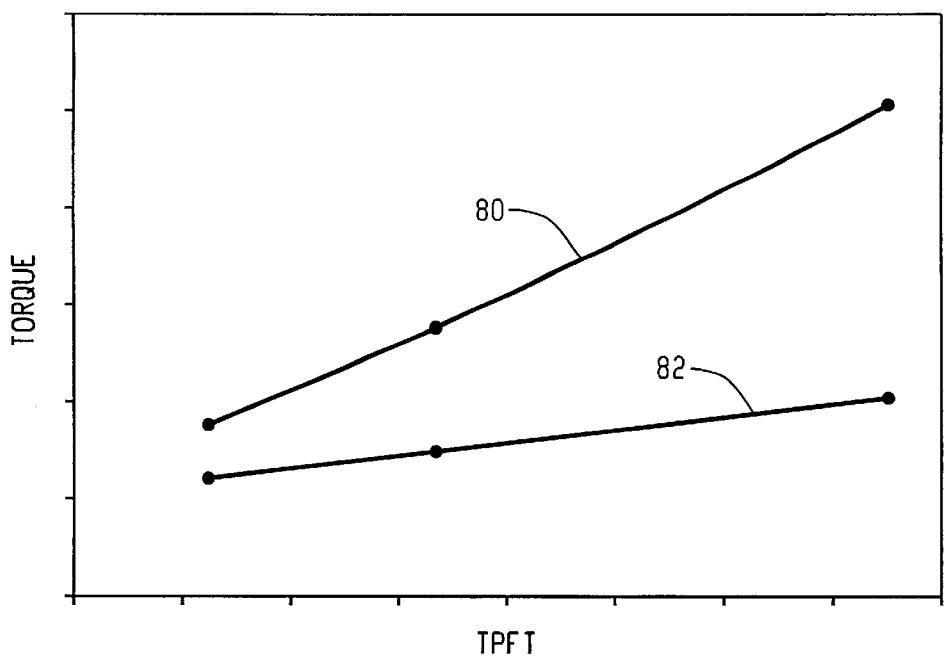
FIG. 5 is a schematic representation of the increased torque associated with the coupling assembly compared to prior arrangements.

As the coupling members are advanced toward one another during make-up of the assembly, the gasket forms a primary seal between the beads 60. Moreover, that radial portion of the gasket between the bead and the raised rim is received in the cavity defined by the planar region 64. This cavity is ultimately filled with gasket material radially outward of the primary seal of the beads. Further, once the annular portion of the gasket engages the enlarged, radial planar region 64 of the seal face, a substantial increase in torque is experienced by the user during make-up. This, of course, is related to the larger surface area of contact between the gasket and the coupling member. Turning, for example, to FIG. 5, upper curve 80 illustrates the substantial increase in torque (y-axis) associated with the tube coupling assembly as it is made-up, e.g., turns past finger tight (x-axis). A conventional, prior art arrangement which exhibits a more linear increase is shown as bottom curve 82. Thus, the more rapid increase of the upper curve 80 relative to the lower curve 82 provides a positive feedback or indication to the use during make-up that the desired amount of displacement has occurred and make-up of the fitting is complete.

At the time of a substantial increase in torque, the preferred sealing pressure is applied to the gasket, and the gasket substantially fills any dead space disposed radially inward of the bead so that a region of low dead space is provided by the completed coupling assembly.

Figure 6:
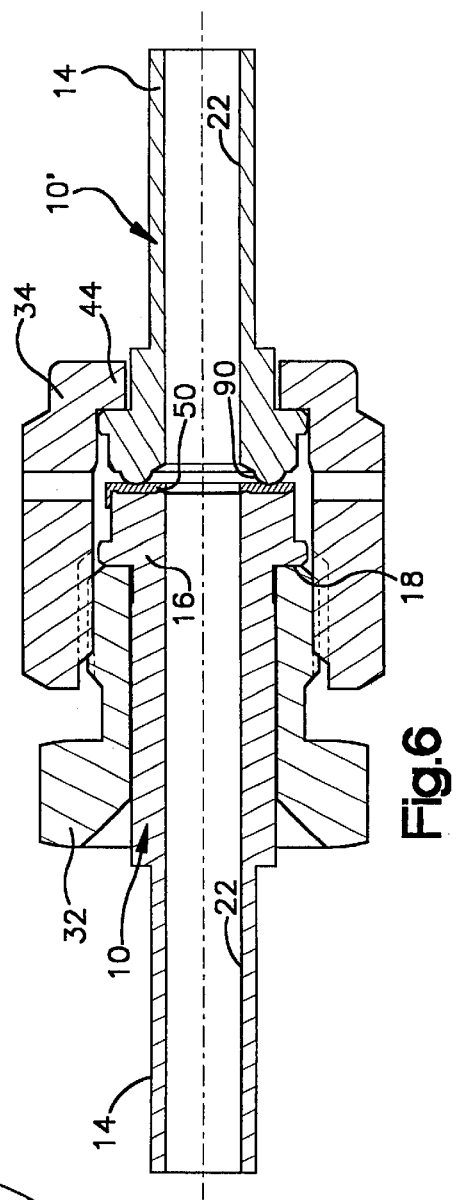
FIG. 6 is a longitudinal cross-sectional view of a universal use of the present invention with a conventional coupling member.

FIG. 6 illustrates the universal adaptability of the present coupling assembly to existing systems. There, the first gland or coupling member 10 is constructed as described in detail above. The second or right-hand gland or coupling member 10' is of a conventional structure. That is, the beads are disposed at a radial median region of the enlarged diameter shoulder of the coupling member. Thus, there is no raised peripheral rim nor is there any substantially planar region that extends over a major portion of the radial seal face. However, the conventional median-spaced bead of the second coupling member is adapted to contact the gasket in a region opposite that of the planar region 64 associated with a new coupling member. Thus, make-up of the fitting allows an old-style coupling member 10' to be functionally compatible with the new-style coupling member 10. The bead 90 of the prior style of coupling member urges the gasket material axially inward into the planar region 64 of the new-style coupling member. Thus, as components of the coupling assembly are necessarily replaced, the new-style coupling member provides a universal comparability with conventional coupling members already in use.

Figure 7A:
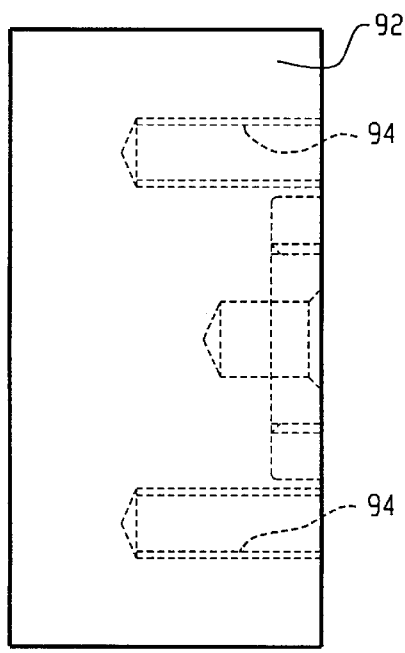
FIG. 7A is an elevational view of the preferred end face shown on a block body.
Figure 7B:
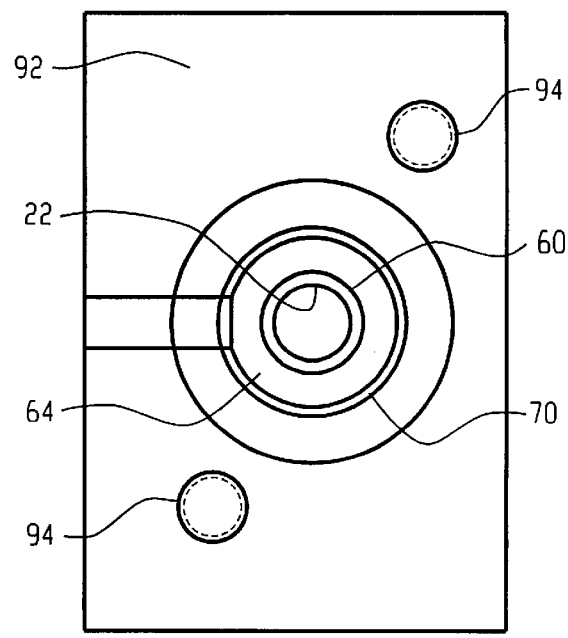
FIG. 7B is an end view taken generally from the right-hand side of FIG. 7A.

FIGS. 7A and 7B also demonstrate that the coupling assembly is not limited to tube coupling arrangements. That is, an end face of a block 92 such as a valve, regulator, etc. is formed with the preferred bead, substantially planar region, and raised rim configuration as described above. A fastener(s) (not shown) associated with the coupling member to be secured to the block engages the external threads 94 integrally formed in the block to urge the end faces together toward opposite faces of the gasket. In all other respects, the coupling assembly is substantially identical in structure and function to that described above.

The invention has been described with reference to the preferred embodiments. Obviously, changes and modifications will become apparent to those skilled in the art and the present invention is intended to cover such changes insofar as they fall within the scope of the appended claims.

Having thus described the invention, it is claimed:

1. In a coupling assembly of the type including first and second coupling members having through bores defined axially therethrough for fluid communication with one another and end faces disposed in facing relation, and a gasket interposed between the end faces to define a sealed relation between the coupling members as the coupling members are axially advanced toward one another in response to a threaded assembly engaging the coupling members, at least one of the first and second coupling members comprising:

a rounded, circumferentially continuous seal bead on the end face adjacent the bore of the one coupling member for contacting the gasket along a radially inner region thereof;

an annular, substantially planar region disposed radially outward of the seal bead of the one coupling member for providing an increase in torque required to make-up the coupling assembly;

a raised ring disposed radially outward of the annular region of the one coupling member for contacting the gasket along a radially outer region of the gasket during initial make-up of the coupling assembly; and a recess in said raised ring of the one coupling member for receiving the gasket therein during make-up of the coupling assembly and locking the one coupling member to the gasket.

2. The invention as defined in claim 1 wherein said ring extends axially outward from the one coupling member a dimension greater than the seal bead so that said ring initially engages the gasket during make-up.

3. The invention as defined in claim 1 wherein said ring of the one coupling member includes at least first and second circumferentially spaced recesses for receiving the gasket therein during make-up and locking the one coupling member to the gasket.

4. The invention as defined in claim 3 wherein the recesses extend over a minor portion of the ring.

5. The invention as defined in claim 3 wherein the recesses are diametrically disposed relative to one another.

6. The invention as defined in claim 1 wherein the other of the first and second coupling members includes:

a rounded, circumferentially continuous seal bead on the end face of the other coupling member adjacent the bore for contacting the gasket along a radially inner region thereof;

an annular, substantially planar region disposed radially outward of the seal bead of the other coupling member for providing an increase in torque required to make-up the coupling assembly; and a raised ring disposed radially outward of the annular region of the other coupling member for engaging the gasket during initial make-up of the coupling assembly.

7. The invention of claim 6 further comprising a recess in the ring of the other coupling member for receiving the gasket therein during make-up and locking the other coupling member to the gasket.

8. The invention of claim 6 wherein said ring of the other coupling member extends axially outward a dimension greater than the seal bead thereof for initially engaging the gasket during make-up.

9. A tube coupling assembly comprising:

a first generally cylindrical gland having a generally central through passage for receiving fluid therethrough, an enlarged radial region having a seal face defined on one end and a radial shoulder facing the other end of the first gland, the seal face including a circumferentially continuous bead extending radially outward from the through passage to form a seal about the passage, an annular substantially planar region proceeding radially outward and axially recessed from the bead, and a raised perimeter extending axially outward from the substantially planar region a dimension greater than the bead; a recess extending axially inward into the raised perimeter for receiving the gasket therein upon make-up of the tube coupling assembly and locking the gasket and the first gland together;

a generally cylindrical second gland having a generally central through passage for receiving fluid therethrough, an enlarged radial region having a bead defined on one end and a radial shoulder facing the other end of the second gland;

a gasket interposed between the first and second glands for sealing therebetween; and a threaded nut arrangement including radial shoulders on cooperating threaded members that engage the respective radial shoulders of the first and second glands for urging the glands into sealing relation with the gasket, whereby the raised perimeter of the first gland initially contacts the gasket along a radially outer region of the gasket before the bead contacts the gasket and the substantially planar region of the first gland provides an increase in torque during make-up of the tube coupling assembly.

10. The invention of claim 9 further comprising a pair of diametrically opposed recesses formed in the raised perimeter for receiving the gasket therein upon make-up of the tube coupling assembly and locking the gasket and the first gland together.

11. The invention of claim 9 wherein the bead of the second gland is circumferentially continuous.

12. The invention of claim 11 wherein the bead of the second gland extends radially outward from the through passage.

13. The invention of claim 9 wherein the one end of the second gland includes an annular substantially planar region proceeding radially outward and axially recessed from the bead.

14. The coupling assembly of claim 13 wherein said gasket forms a primary seal between the beads and a secondary seal between the annular planar regions.

15. The invention of claim 13 wherein the one end of the second gland includes a raised perimeter extending axially outward from the annular region.

16. The invention of claim 15 wherein the raised perimeter of the second gland extends axially outward a dimension greater than the bead.

17. The invention of claim 15 further comprising first and second recesses in the raised perimeter for locking the second gland to the gasket upon make-up of the tube coupling assembly.

* * * * *